Nov. 29, 1938.  G. W. GRISDALE  2,138,153
GAS PURIFYING DEVICE
Filed May 16, 1936  2 Sheets-Sheet 1
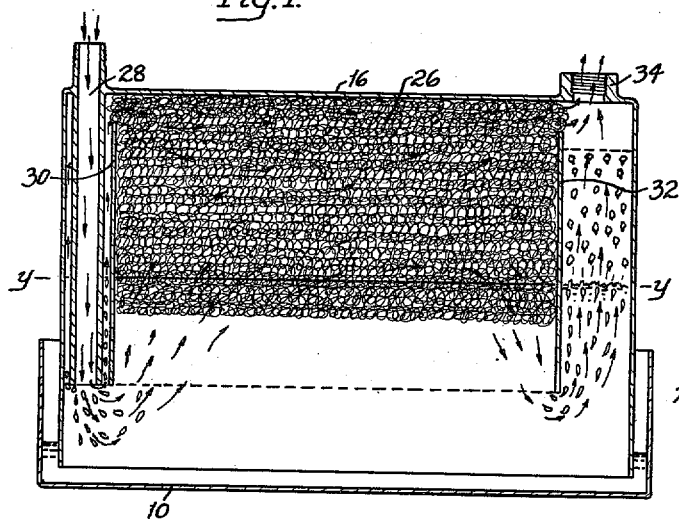
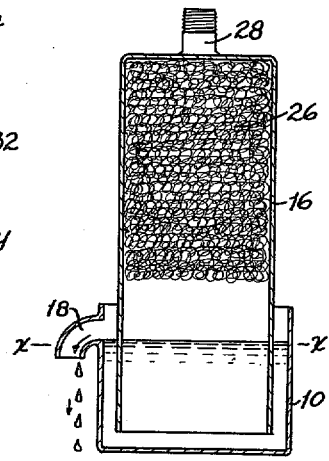
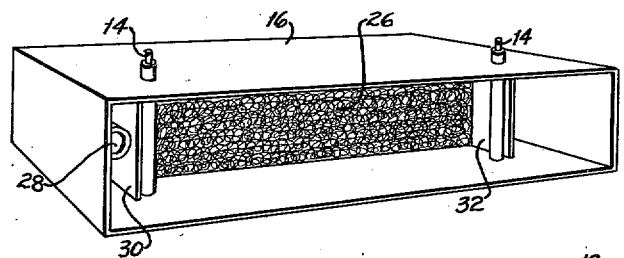
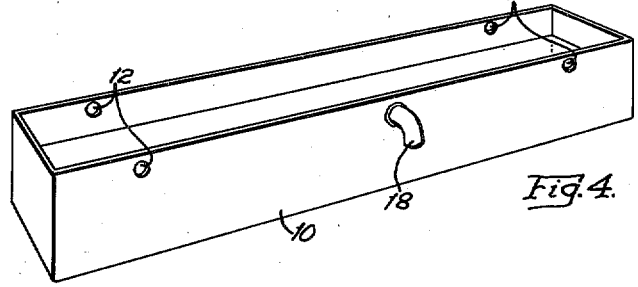
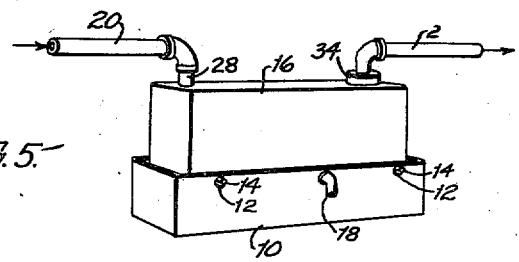
Inventor
George W. Grisdale
by McConkey & Booth
Attorneys

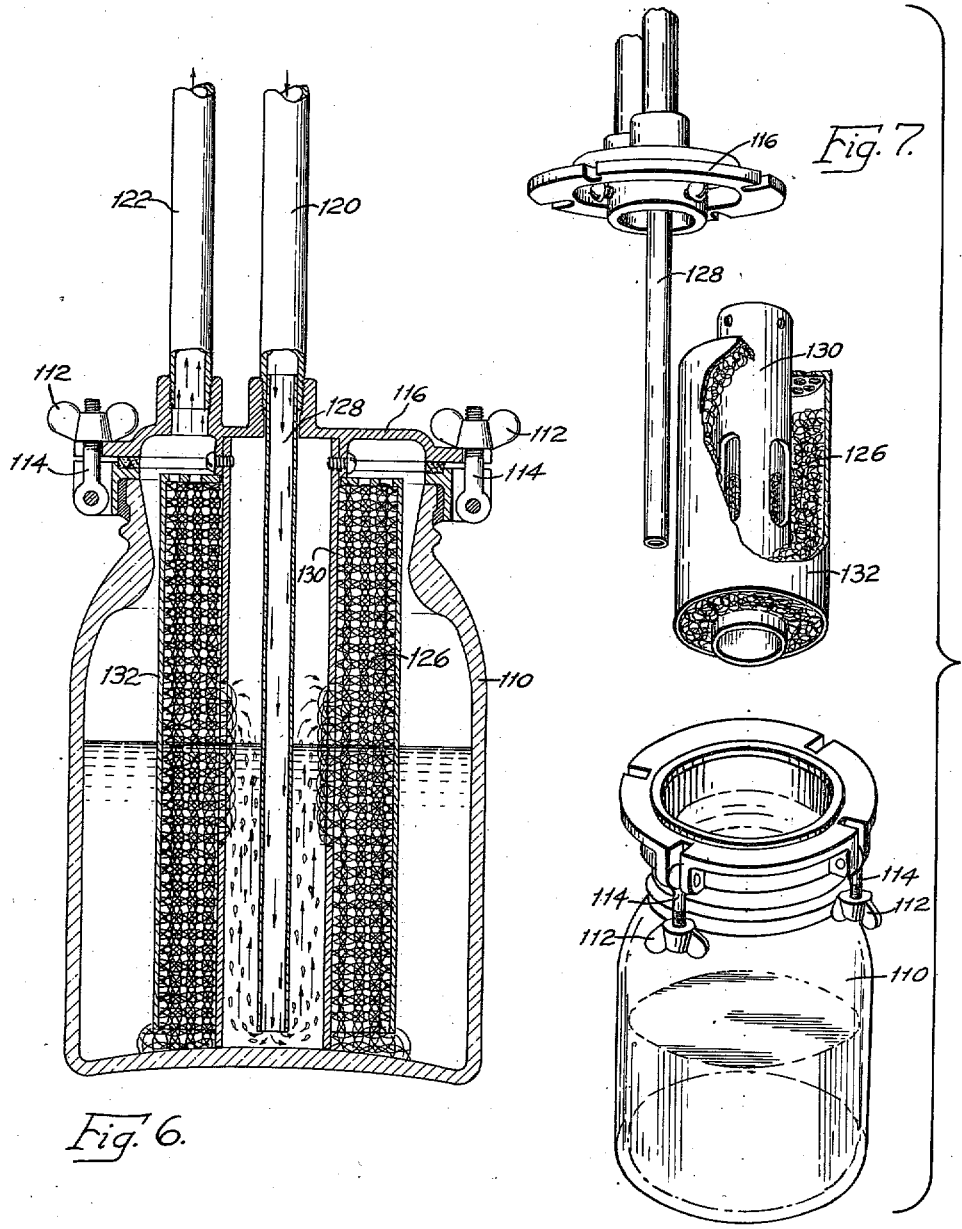

Patented Nov. 29, 1938

2,138,153

UNITED STATES PATENT OFFICE 2,138,153

GAS-PURIFYING DEVICE

George W. Grisdale, Chicago, Ill., assignor to Republic Flow Meters Company, Chicago, Ill., a corporation of Illinois Application May 16, 1936, Serial No. 80,205

8 Claims. (Cl. 23—284)

This invention relates to devices for purifying gases, and is illustrated as embodied in a device for removing sulphur dioxide from flue gases which are to be analyzed to determine their content of carbon dioxide, so that the sulphur dioxide will not upset the accuracy of the analysis by its action on the reagent used.

In removing sulphur dioxide from such gases, it is found that it is effective to pass the gases through a water bath and also to pass them over a large surface kept wet for the purpose of absorbing them. It is also found that the rate of absorption is greatly increased by the catalytic action of certain soluble sulphur salts, notably iron sulphate, in the solution used for absorbing the sulphur dioxide.

An object of the present invention is to provide a simple and effective device for utilizing these principles, by passing the gases through a bath of water and also over a large surface of steel wool or similar material, which is kept wet, and preferably also to facilitate a reaction of the sulphur dioxide with the steel wool or equivalent material, in the presence of water, to keep the water in the bath supplied with iron sulphate or other catalyst.

In one desirable arrangement the device comprises a lower receptacle adapted to contain water, and which is shown supported by a member carrying or forming a hood or the like containing the steel wool or other material having the desired large surface and giving the desired type of reaction. The water in the lower receptacle may, if desired, be open to the pressure of the atmosphere, so that if the device becomes plugged up, when a predetermined suction builds up the device will allow air to pass through instead of sucking water over.

I prefer to arrange the intake as a vertical tube passing through (and which may if desired be integral with) the supporting member, and which opens below the water level, so that the flue gases bubble through the water bath. In one embodiment, there is also provided a guide, for example an outer passage surrounding the intake tube, which receives some of the gases bubbling upwardly from the water bath, with a considerable amount of entrained moisture, and discharges into the body of steel wool or its equivalent.

In another embodiment, the absorption material is arranged as a cylindrical filter unit surrounding the intake tube and having the gases passing through the absorption material heightwise of the unit.

In both embodiments the sulphur dioxide reacts on the large steel surface, in the presence of air and moisture, to form iron sulphate in solution in the water passing back into the bath from the steel wool. This iron sulphate is in effect a catalyzer facilitating the absorption of the sulphurous gases from the flue gases passing through the device.

The above and other objects and features of the invention, including various novel combinations of parts and desirable particular constructions, will be apparent from the following description of the illustrative embodiment shown in the accompanying drawings, in which:

Figure 1 is a vertical section longitudinally through the device;

Figure 2 is a vertical section transversely therethrough;

Figure 3 is a perspective view of the upper hood-shaped member, turned on its side;

Figure 4 is a perspective view of the lower water container;

Figure 5 is a perspective view of the assembled device, with its connections;

Figure 6 is a section vertically through another embodiment; and

Figure 7 is an exploded perspective view thereof showing the parts before assembly.

The device illustrated in Figures 1 to 5 comprises generally a lower container 10 for water, formed with openings 12 adapted to hook over the ends of pins 14 mounted in (or be otherwise supported by) an upper hood-shaped member 16. The container 10 and the member 16 are shown of rectangular form, with the container 10 enough larger than the member 16 so that it is open to the atmosphere around the periphery of the member 16, and so that it may be shifted laterally to engage the openings 12 with the pins 14 or to disengage them therefrom.

As shown in Figure 2, the container 10 is initially filled with a bath of water up to a level X—X determined by an overflow 18. When the device is connected as shown in Figure 5, between a conduit 20 leading to it from a source of supply of flue gases, and a conduit 2 leading to a device for analyzing the gases (for example such a device as described in application No. 62,420, filed February 5, 1936, by Albert F. Spitzglass and George W. Grisdale), sufficient suction is applied to the device to raise the water inside the member 16 to some higher level Y—Y (Figure 1) inside the member 16, with a corresponding drop in the water level in the part of container 10 outside the periphery of the member 16.

This rise in the water level brings the surface of the water bath above the bottom of a mass of steel wool, or equivalent material, 26 packed into the top of the member 16.

Member 16 is provided with an intake tube 28 (shown integral therewith) passing vertically therethrough and opening at its lower end below the water level but above the low edge of the side wall of member 16. The upper end of this intake tube is connected to the conduit 20 leading from the source of flue gases. Adjacent this intake tube 28, and illustrated as formed by a vertical partition or guide 30, is a guide passage open at its lower end, which receives some of the gases bubbling through the water from the intake tube 28, and discharges them through openings above the level Y—Y into the body of the material 26. These gases carry with them considerable entrained water, keeping the material 26 always wet.

The other end of the member 16 is provided with outlet means such as a vertical tube or passage, formed for example by a vertical partition 32, having openings leading from the body of the material 26, and dipping at its lower end below the level Y—Y so that the outlet passage formed by it opens below the water level. This outlet passage is continued, in the arrangement illustrated, as a boss or connection 34 connected to the conduit 22.

In the operation of the device, the gases pass from the intake 28, partly through the water and partly through the material 26, to the outlet passage formed by the partition 32. The sulphur dioxide in the gases passing through the material 26 reacts on that material, in the presence of air and water, to form iron sulphate, in solution in the water spread over the surface of the material, and this solution drips back into the water bath below. It is found in practice that the iron sulphate acts as a catalyzer, greatly facilitating the oxidation of the sulphur dioxide and its absorption by the water as sulphuric acid and sulphates of other impurities in the flue gases, as well as in the form of iron sulphate.

Other materials than steel wool can be used for the above-described purpose. For example manganese, in a form offering a large surface, is even more effective than steel or iron, but is more expensive. As the concentration of the catalyst increases, the efficiency of the device in absorbing sulphur dioxide also increases until a critical point is reached (1.2 per cent for iron and 0.025 per cent for manganese), after which the efficiency does not change materially until the solution becomes quite concentrated. At that time it becomes necessary to renew the water in the container. This may conveniently be done at specified intervals, for example every three months.

If the filter becomes plugged up in use, the increased vacuum in the outlet passage will raise the water level therein with a consequent lowering of the water level in the housing 16. After the water level reaches the lower edge of the baffle 32 gas will pass directly therearound to bubble up through the water in the outlet passage. If for any reason there should be a further increase in vacuum the water level in the container 10 will be reduced to the point where air can pass around the lower edge of the housing 16 and directly into the outlet passage. Thus in no event will water be sucked through into the analyzer.

It will be noted also, that the gases are cooled in passing through the device, which cuts down the cooling effect necessary in the analyzer, and that the water is heated. Hot water acts more effectively than cold water in the oxidation of sulphur dioxide to sulphur trioxide, so this heating action is advantageous in the operation of the filter.

Figures 6 and 7 show a different embodiment, operating on the same principle. The various parts in these figures are designated by reference characters 100 greater than those used for the corresponding parts in Figures 1–5.

In this embodiment, the gases from the supply conduit 120 enter through an intake 128 depending from a cover 116 attached by means such as wing nuts 112 and pivoted bolts 114 to a glass jar 110 partly filled with water. The gases bubble from the lower end of the intake 128, through the water, into a space defined by a cylindrical wall 130 secured at its upper end to the lower face of the cover 116, and which coaxially surrounds the intake 128.

The wall 130 is formed with openings extending above and below the water level, and through which the gases (carrying a substantial amount of water with them) pass into a cylindrical mass or cartridge of steel wool 126 confined in an annular cylindrical shape between the wall 130 and an outer hood-shaped member or confining wall 132. The member 132 is shown as extended to form a perforated top for the space containing the material 126.

The wall 130 may extend substantially to the bottom of the jar 110, but does not form a tight joint therewith, so that water from outside the wall 130 passes freely into it to replace what is carried upwardly by the gases. The water is practically all deposited on the surface of the steel wool, keeping it wet, and practically none of it remains in the gases as they leave through the conduit 122.

It will be seen that part of the sulphur dioxide is absorbed in bubbling up through the water, or rather through the dilute iron-sulphate solution which is soon formed from the water, and the remainder in passing over the wet surface of the upper half of the steel wool, through which the gases pass heightwise.

While one form of apparatus has been described in detail, it is not my intention to limit the scope of the invention by that description, or otherwise than by the terms of the appended claims.

I claim:

1. A device for absorbing impurities from a stream of gas comprising upper and lower parts, the upper one carrying a fibrous mass and the lower one containing water which when in use extends up into the fibrous mass, said device having an intake port opening below the level of the water and an outlet passage having openings below the level of the water and above that level and in direct communication with said fibrous mass.

2. A device for absorbing sulphur dioxide from a stream of gas comprising upper and lower parts, the upper one carrying a fibrous mass of a metal capable of reacting with sulphur dioxide and water to give a soluble salt and the lower one containing water which when in use extends up into the mass of fibrous metal, said device having an intake port opening below the level of the water and an outlet passage having openings below the level of the water and above that level and in direct communication with said fibrous mass.

3. A device for absorbing impurities from a stream of gas comprising upper and lower parts, the upper one carrying a fibrous mass and the lower one containing water which when in use extends up into the fibrous mass, said device having an intake port opening below the level of the water and an outlet passage having openings below the level of the water and above that level and opposite said fibrous mass, the intake port being provided by a vertical tube provided with an outer passage open at its lower end to receive part of the gases discharged into the water from said vertical tube and arranged to discharge the gases so received into the body of the fibrous mass.

4. A device for absorbing impurities from a stream of gas comprising a container for water to wash the gas, and a hood-shaped filter member containing a mass of material having a very large surface area and adapted to permit the passage of the gas therethrough and which material dips into and is sealed at its lower surface by the water in the container when the device is in use, said member having an intake port for gas opening below the level of the water and also having outlet means for receiving the gas after passing through the water and said material, said intake port being provided by a vertical tube passing through said member and opening below the water level, and said member having means forming a vertical passage to collect part of the gas bubbling through the water and to guide it into the body of said material.

5. A device for absorbing impurities from a stream of gas comprising a water container open at the top, a hood-shaped member open at its bottom and which dips at its lower edge into and is sealed by water in said container, means on said hood-shaped member for supporting the water container, an intake tube extending vertically down through one end of the hood-shaped member and which opens below the level of the water in said container, a mass of metal wool in the hood-shaped member above the water, and an outlet at the other end of the hood-shaped member for the purified gas, said hood-shaped member having a passage receiving some of the gas bubbling through the water from the lower end of the intake tube and arranged to guide the gas so received into the body of the metal wool.

6. A device for absorbing impurities from a stream of gas comprising a water container open at the top, a hood-shaped member open at its bottom and which dips at its lower edge into and is sealed by water in said container, means on said hood-shaped member for supporting the water container, an intake tube extending vertically down through one end of the hood-shaped member and which opens below the level of the water in said container, a mass of metal wool in the hood-shaped member above the water, and an outlet at the other end of the hood-shaped member for the purified gas, said hood-shaped member having an outer passage surrounding the intake tube and open at its lower end for the purpose of receiving some of the gas bubbling through the water from the lower end of the intake tube and having one or more openings above the water level arranged to guide the gas so received into the body of the metal wool.

7. A device for absorbing impurities from a stream of gas comprising a water container open at the top, a hood-shaped member open at its bottom and which dips at its lower edge into and is sealed by water in said container, means on said hood-shaped member for supporting the water container, an intake tube extending vertically down through one end of the hood-shaped member and which opens below the level of the water in said container, a mass of metal wool in the hood-shaped member above the water and dipping into the water, and an outlet at the other end of the hood-shaped member for the purified gas, said outlet comprising a vertical passage opening at its lower end below the water level in said container and having an opening above the water level.

8. A device for absorbing impurities from a stream of gas comprising a water container open at the top, a hood-shaped member open at its bottom and which dips at its lower edge into and is sealed by water in said container, means on said hood-shaped member for supporting the water container, an intake tube extending vertically down through one end of the hood-shaped member and which opens below the level of the water in said container, a mass of metal wool in the hood-shaped member above the water, and an outlet at the other end of the hood-shaped member for the purified gas, said hood-shaped member having a passage receiving some of the gas bubbling through the water from the lower end of the intake tube and arranged to guide the gas so received into the body of the metal wool, said outlet comprising a vertical passage opening at its lower end below the water level in said container and having one or more openings above the water level and which communicates with the exterior of the hood-shaped member.

GEORGE W. GRISDALE.